United States Patent
Sekizuka

(10) Patent No.: US 11,529,924 B2
(45) Date of Patent: Dec. 20, 2022

(54) OCCUPANT CRASH PROTECTION DEVICE FOR VEHICLE

(71) Applicant: Toyota Jidosha Kabushiki Kaisha, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/400,904

(22) Filed: Aug. 12, 2021

(65) Prior Publication Data

US 2022/0097641 A1 Mar. 31, 2022

(30) Foreign Application Priority Data

Sep. 29, 2020 (JP) .............................. JP2020-163896

(51) Int. Cl.
*B60R 21/207* (2006.01)
(52) U.S. Cl.
CPC ................................. B60R 21/207 (2013.01)
(58) Field of Classification Search
CPC ................................................... B60R 21/207
See application file for complete search history.

(56) References Cited

U.S. PATENT DOCUMENTS

| | | | | |
|---|---|---|---|---|
| 5,333,899 A | * | 8/1994 | Witte ................ | B60R 21/23138 280/730.2 |
| 6,406,057 B1 | * | 6/2002 | Fischer ................ | B60R 21/232 280/730.2 |
| 7,455,314 B2 | * | 11/2008 | Ryan ..................... | B60R 21/207 280/730.2 |
| 7,938,440 B2 | * | 5/2011 | Kataoka ................ | B60R 21/213 280/730.2 |
| 2005/0156414 A1 | | 7/2005 | Noguchi et al. | |
| 2013/0001933 A1 | * | 1/2013 | Umehara .............. | B60R 21/213 280/730.2 |
| 2022/0097645 A1 | * | 3/2022 | Akiyama .............. | B60R 21/207 |

FOREIGN PATENT DOCUMENTS

| | | | | |
|---|---|---|---|---|
| CN | 112739581 A | * | 4/2021 | ........... B60N 2/4235 |
| DE | 102020201839 A1 | * | 10/2020 | ............ B60N 2/427 |
| JP | 2005-178611 A | | 7/2005 | |
| JP | 2008114631 A | * | 5/2008 | |
| JP | 2008114713 A | * | 5/2008 | |
| JP | 2013-010381 A | | 1/2013 | |
| JP | 2019-131161 A | | 8/2019 | |

* cited by examiner

*Primary Examiner* — Faye M Fleming
(74) *Attorney, Agent, or Firm* — Dinsmore & Shohl LLP

(57) ABSTRACT

An occupant crash protection device is an occupant crash protection device for a vehicle including an aisle between a side face of a seat in the vehicle width direction and a vehicle cabin wall facing the side face. The occupant crash protection device includes: a seat-side airbag device configured to deploy a seat-side gas cushion portion between the aisle and an occupant sitting on the seat, the seat-side airbag device being placed around the seat; and a wall-side airbag device including a wall-side gas cushion portion configured to be deployed downward from the upper side of the vehicle cabin wall, the wall-side airbag device being placed inside an end part, on the vehicle cabin wall side, of a ceiling surface.

3 Claims, 18 Drawing Sheets

OCCUPANT CRASH PROTECTION DEVICE FOR VEHICLE

CROSS-REFERENCE TO RELATED APPLICATION

This application claims priority to Japanese Patent Application No. 2020-163896 filed on Sep. 29, 2020, incorporated herein by reference in its entirety.

BACKGROUND

1. Technical Field

The present disclosure relates to an occupant crash protection device for a vehicle. Particularly, in terms of a vehicle including an aisle between a side face of a seat in the vehicle width direction and a vehicle cabin wall facing the side face, the present disclosure relates to an occupant crash protection device having an effect to restrain an occupant sitting on the seat from being thrown out to the aisle side at the time of a side collision of the vehicle and an effect to absorb an impact to be applied to the occupant.

2. Description of Related Art

Japanese Unexamined Patent Application Publication No. 2005-178611 (JP 2005-178611 A) describes the following configuration. That is, a curtain airbag is placed along a roof side portion of a vehicle in a folded state, and when the vehicle has a side collision, the curtain airbag is inflated and deployed downward so as to protect an occupant.

SUMMARY

In the configuration described in JP 2005-178611 A, in a case where an aisle is formed between a seat on which the occupant sits and a vehicle cabin wall facing a side face of the seat in the vehicle width direction, a large space is formed by the aisle beside the seat. As a result, when the vehicle has a side collision (at the time of a side collision), the occupant may be greatly thrown out such that the occupant falls down to the aisle side, for example, and the occupant may receive a large impact from the vehicle.

In order to restrain the occupant from being thrown out at the time of a side collision, it is also conceivable that only a single body of an airbag device deploys a gas cushion portion between the seat and the vehicle cabin wall such that the gas cushion portion extends in the vehicle width direction. However, this case poses such a disadvantage that the single body of the airbag device is upsized and it takes time to deploy the gas cushion portion.

The present disclosure relates to an occupant crash protection device for a vehicle including an aisle between a seat and a vehicle cabin wall, and an object of the present disclosure is to restrain an occupant sitting on the seat from being thrown out to the aisle side when the vehicle has a side collision and to effectively absorb an impact to be applied to the occupant without excessively upsizing a single body of an airbag device.

An occupant crash protection device for a vehicle according to the present disclosure is an occupant crash protection device for a vehicle including a seat on which an occupant sits and an aisle between a side face of the seat in a vehicle width direction and a vehicle cabin wall facing the side face. The occupant crash protection device includes a seat-side airbag device and a wall-side airbag device. The seat-side airbag device is configured to deploy a seat-side gas cushion portion between the aisle and the occupant sitting on the seat, the seat-side airbag device being placed around the seat. The wall-side airbag device includes a wall-side gas cushion portion configured to be deployed downward from the upper side of the vehicle cabin wall, the wall-side airbag device being placed inside an end part, on the vehicle cabin wall side, of a ceiling surface.

In the occupant crash protection device according to the present disclosure, in a case where a large space is provided due to the presence of the aisle between the seat and the vehicle cabin wall, when a load caused by a side collision is applied to the vehicle from an outer end on the aisle side in the width direction, and the occupant is thrown out to the aisle side, the deployed seat-side gas cushion portion is pushed by the occupant falling down to the aisle side, so that the seat-side gas cushion portion deforms to the aisle side. At this time, the seat-side gas cushion portion deforms such that its distal end side approaches the wall-side gas cushion portion deployed downward from the upper side. Hereby, a distal end part of the seat-side gas cushion portion is pressed against the wall-side gas cushion portion, so that the distal end part can easily support the body of the occupant moved to the aisle side. This makes it possible to easily restrain the occupant from being greatly thrown out to the aisle side and to easily absorb an impact to be applied to the occupant. Further, in this configuration, a support body that supports the occupant can be easily formed immediately by two airbag devices without excessively upsizing respective single bodies of the airbag devices.

In the occupant crash protection device according to the present disclosure, the seat-side airbag device may be placed under a seat cushion having a seating face of the seat or closer to the aisle side than the seat cushion. The seat-side gas cushion portion may be configured to be deployed upward by passing by a side face of the seat cushion in the vehicle width direction.

In the above configuration, when the vehicle has a side collision, the distal end side of the seat-side gas cushion portion moves to the aisle side along with the falling of the occupant to the aisle side. At this time, since the seat-side gas cushion portion is deployed upward by passing by the side face of the seat cushion in the vehicle width direction, most part of the seat-side gas cushion portion in the up-down direction can be easily deformed along the body of the occupant. This makes it possible to further easily restrain the occupant from being greatly thrown out to the aisle side.

In the occupant crash protection device according to the present disclosure, the seat-side airbag device may be placed on the aisle side of a seatback of the seat. The seat-side gas cushion portion may be configured to be deployed forward.

In the above configuration, the seat-side airbag device is not placed beside the occupant in a normal time when no collision occurs in the vehicle. Accordingly, the space between the occupant and the vehicle cabin wall is wide.

With the occupant crash protection device according to the present disclosure, without excessively upsizing respective single bodies of the airbag devices, it is possible to restrain the occupant sitting on the seat from being thrown out to the aisle side when the vehicle has a side collision and to effectively absorb an impact to be applied to the occupant.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 is viewed from above;

FIG. 3 is viewed from above;

FIG. 3 is viewed from the left side of the vehicle;

FIG. 6 is viewed from the left side of the vehicle;

FIG. 10 is viewed from above;

FIG. 12 is viewed from the left side of the vehicle;

DETAILED DESCRIPTION OF EMBODIMENTS

With reference to the drawings, the following describes an occupant crash protection device for a vehicle according to an embodiment. In this description, specific shapes, materials, numbers, arrangement positions, and the like are examples to facilitate understanding of the present disclosure and can be modified appropriately in conformity to specifications. Further, an arrow F, an arrow U, and an arrow R illustrated in each figure indicate a front direction, an upper direction, and a right direction in the vehicle, respectively. Further, directions reverse to the arrows F, U, R indicate a rear direction, a lower direction, and a left direction in the vehicle, respectively.

Figure 1:
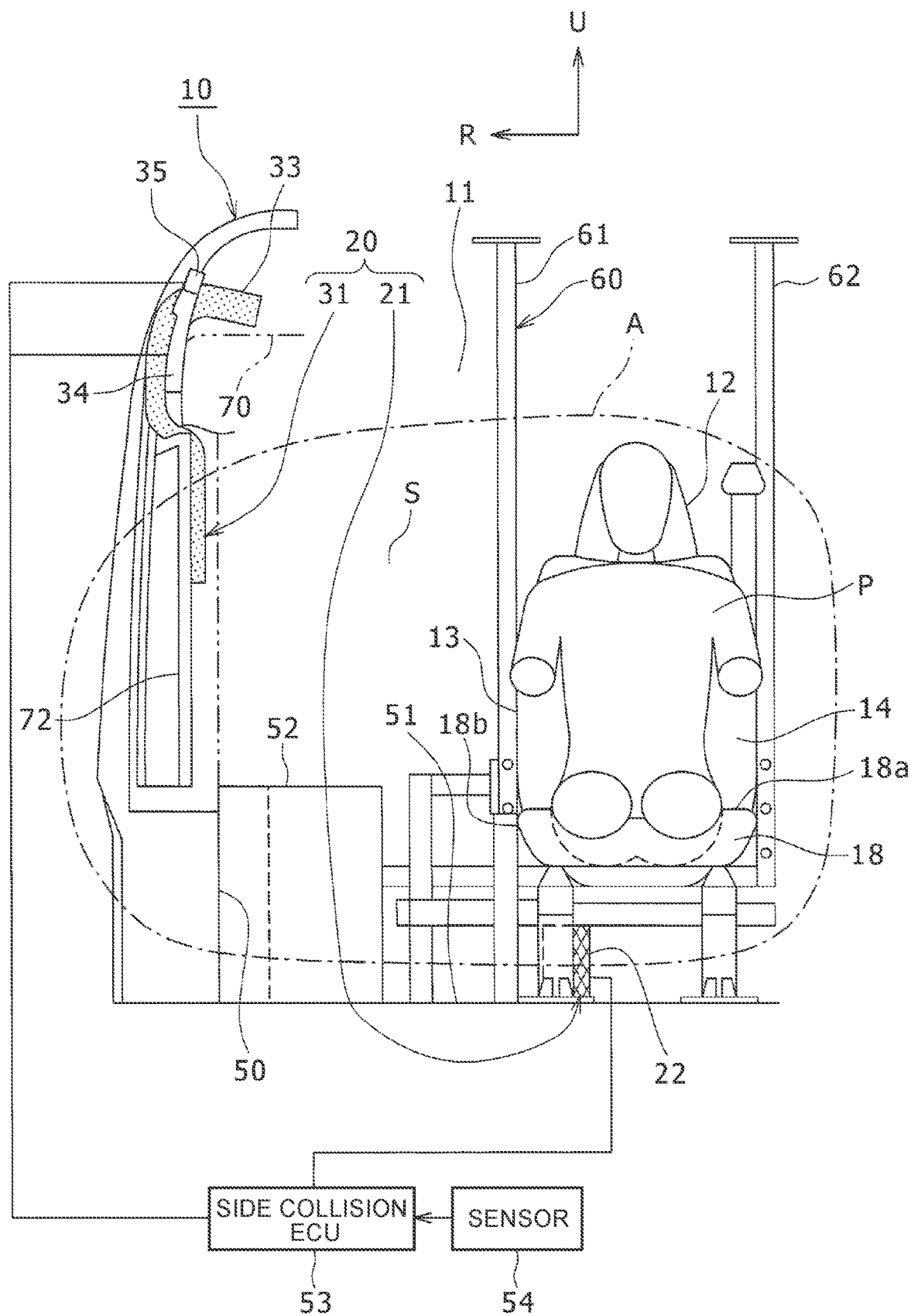
FIG. 1 is a cross-sectional view of a vehicle-cabin front part of a vehicle into which an occupant crash protection device for the vehicle according to an embodiment of the present disclosure is incorporated.
Figure 2:
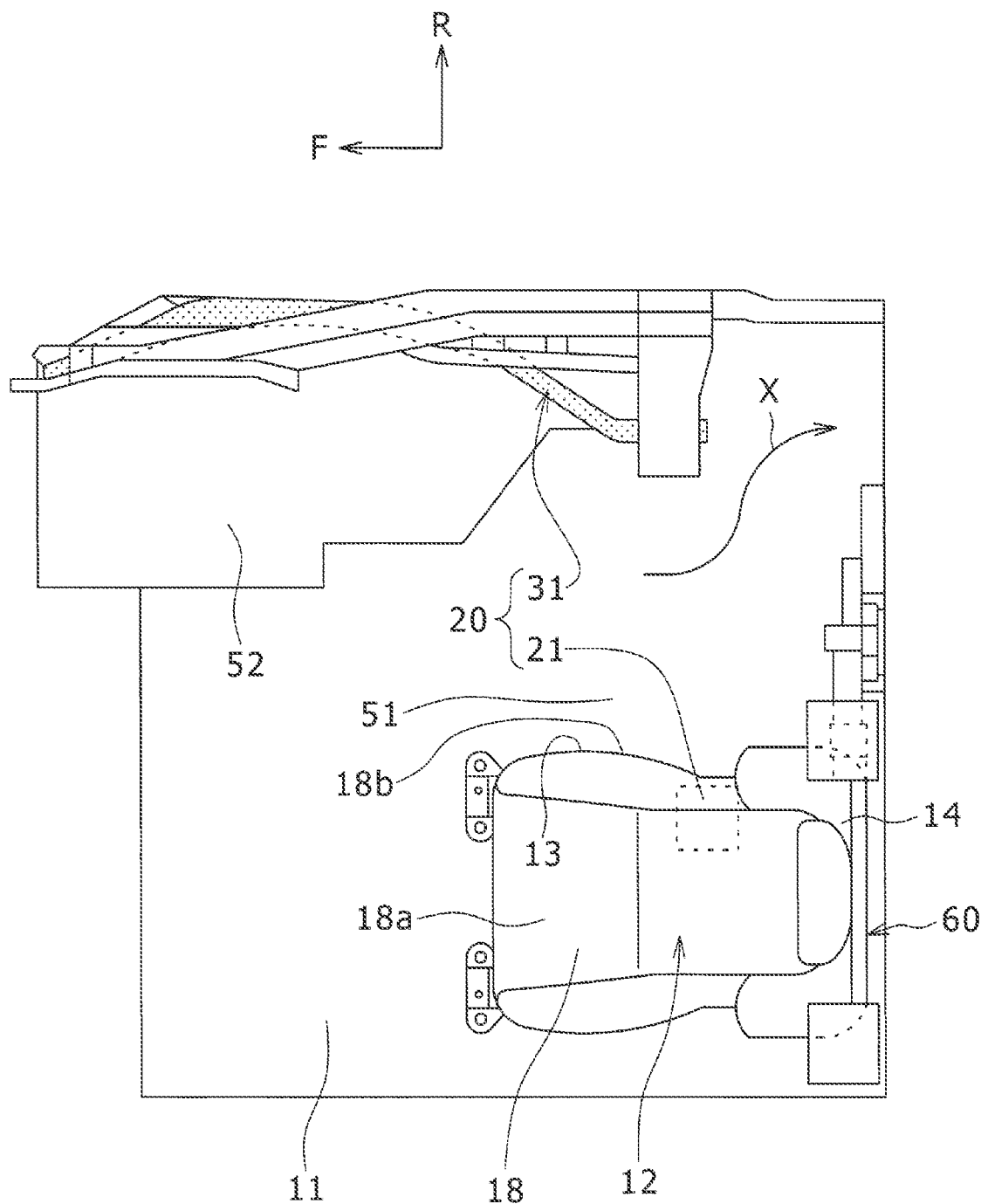
FIG. 2 is a view when

FIG. 1 is a cross-sectional view of a front part of a vehicle cabin 11 of a vehicle 10 into which an occupant crash protection device 20 according to the embodiment is incorporated. FIG. 2 is a view when FIG. 1 is viewed from above. The vehicle 10 is a bus-shaped vehicle configured such that an operator seat 12 on which an operator as an occupant sits is placed on the front side in the vehicle cabin 11, and a plurality of passenger seats (not shown) on which a plurality of passengers can sit is placed behind the operator seat 12. The vehicle 10 is basically operated in an automated manner. For example, the passengers can sit on either side of the vehicle 10 behind the operator seat 12 and get in and off the vehicle 10 through a doorway (not shown) configured to be opened and closed by a door. The operator can sit on the operator seat 12 and perform operations such as start and stop of the vehicle and open and close of the door as needed. Note that, the vehicle 10 may not be a self-driving vehicle and may be configured such that the operator regularly drives the vehicle 10 by use of a steering wheel and an accelerator pedal. In FIG. 1, the operator seat 12 may be placed in the center of the vehicle cabin 11 in the vehicle width direction. Note that, in FIG. 1 and some figures to be described below, a dummy P for impact test sits on the operator seat 12, instead of an actual operator. In the following description, for description of the position of the operator sitting on the operator seat 12, the dummy P may be referred to as an operator P.

In the vehicle 10, an aisle 51 is provided between a right side face 13 that is a side face of the operator seat 12 in the vehicle width direction and a vehicle cabin wall 50 facing the right side face 13. The vehicle cabin wall 50 includes a trim made of resin and forms a side face of the vehicle cabin 11. The operator or the passengers can pass the aisle 51. Hereinafter, the operator seat 12 is referred to as the seat 12. The following mainly describes a case where the aisle 51 is formed on the right side in the vehicle cabin 11 of the vehicle 10. A seat frame structure 60 formed in combination of vertical pillar portions 61, 62 and a lateral frame is placed behind the seat 12. The vertical pillar portions 61, 62 and the lateral frame are provided to support the seat 12. The aisle 51 can be passed rearward along an arrow X-direction in FIG. 2 from the right side of the seat 12 while the aisle 51 avoids the seat frame structure 60. A cover portion 52 having a flat upper end is placed at a position adjacent to the vehicle cabin side of a lower part of the vehicle cabin wall 50 such that the cover portion 52 extends in the front-rear direction. The cover portion 52 is constituted by a trim made of resin, and a device such as an air-conditioning device, an electronic device, and so on are accommodated inside the cover portion 52.

The occupant crash protection device 20 includes a seat-side airbag device 21 and a wall-side airbag device 31. The seat-side airbag device 21 is placed around the seat 12. When a side collision of the vehicle 10 is detected, the seat-side airbag device 21 deploys a seat-side gas cushion portion 23 (FIGS. 3 to 4) between the aisle 51 and the operator P sitting on the seat 12 such that the seat-side gas cushion portion 23 is deployed upward from the lower side of the seat 12.

More specifically, the seat 12 includes a generally upright seatback 14 and a seat cushion 18 having a seating face 18a. The seat-side airbag device 21 includes a case 22 placed on a floor face under the seat cushion 18 of the seat 12, and the seat-side gas cushion portion 23 (FIGS. 3, 4) housed inside the case 22.

The case 22 has a rectangular-solid shape and is made of resin. The case 22 is indicated by oblique grid in FIG. 1. An annular or generally U-shaped thinned part is formed in a right side face part of the case 22. When the seat-side gas cushion portion 23 is deployed, a part placed inward of the thinned part of the right side face part is greatly pushed rightward by the seat-side gas cushion portion 23, so that the thinned part is easily broken. Due to this breakage, an opening through which the seat-side gas cushion portion 23 can pass to outside is formed in the right side face part.

Further, a first inflator (not shown) is fixed to the inside of the case 22. The first inflator includes an ignition agent, a gas generation portion, and a gas emission port. A side collision ECU 53 illustrated in FIG. 1 is electrically connected to the first inflator. A gas feed opening (not shown) of the seat-side gas cushion portion 23 (FIGS. 3, 4) is connected to the gas emission port.

Figure 3:
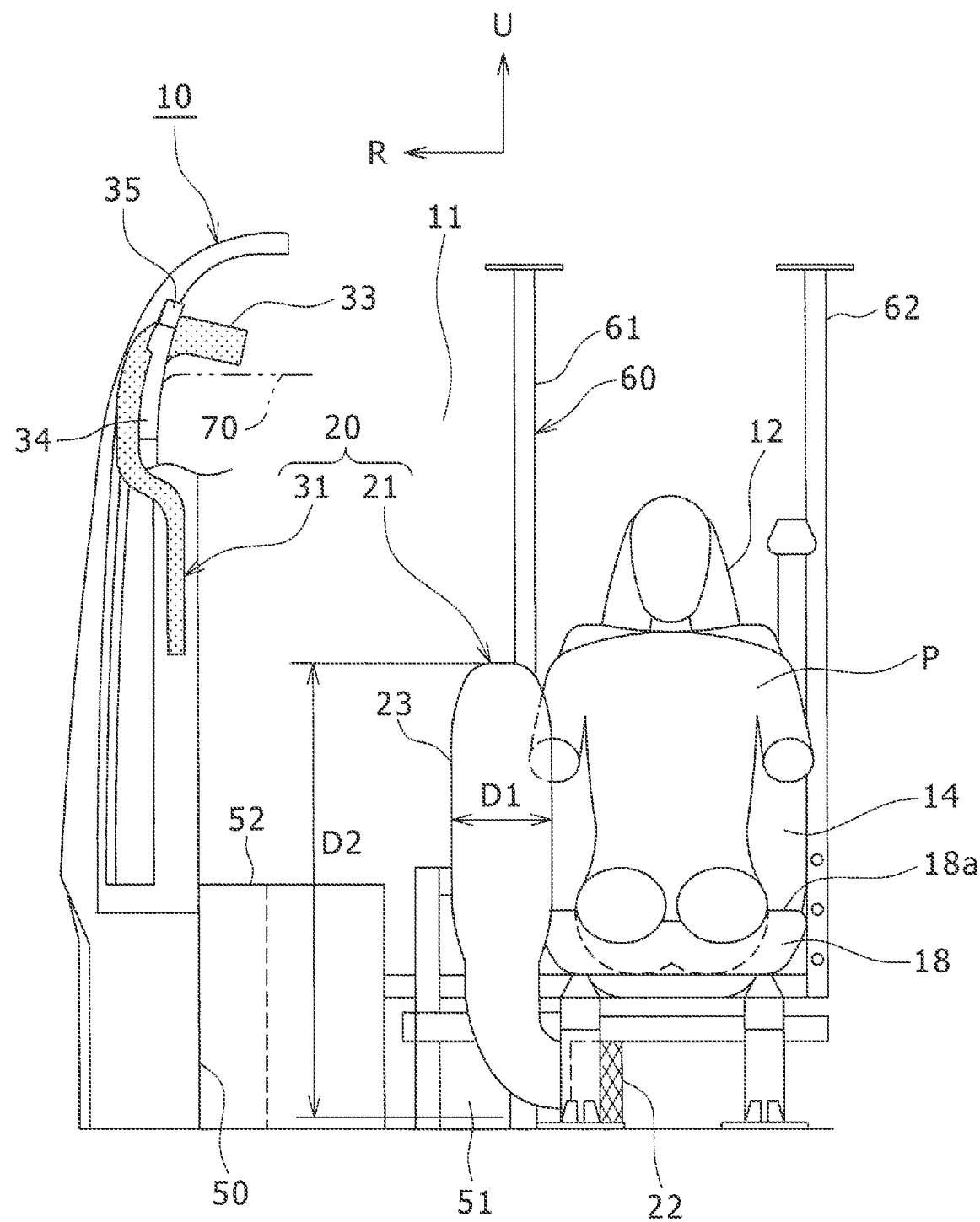
FIG. 3 is a view corresponding to FIG. 1 and illustrates a state where a seat-side airbag device is activated.
Figure 4:
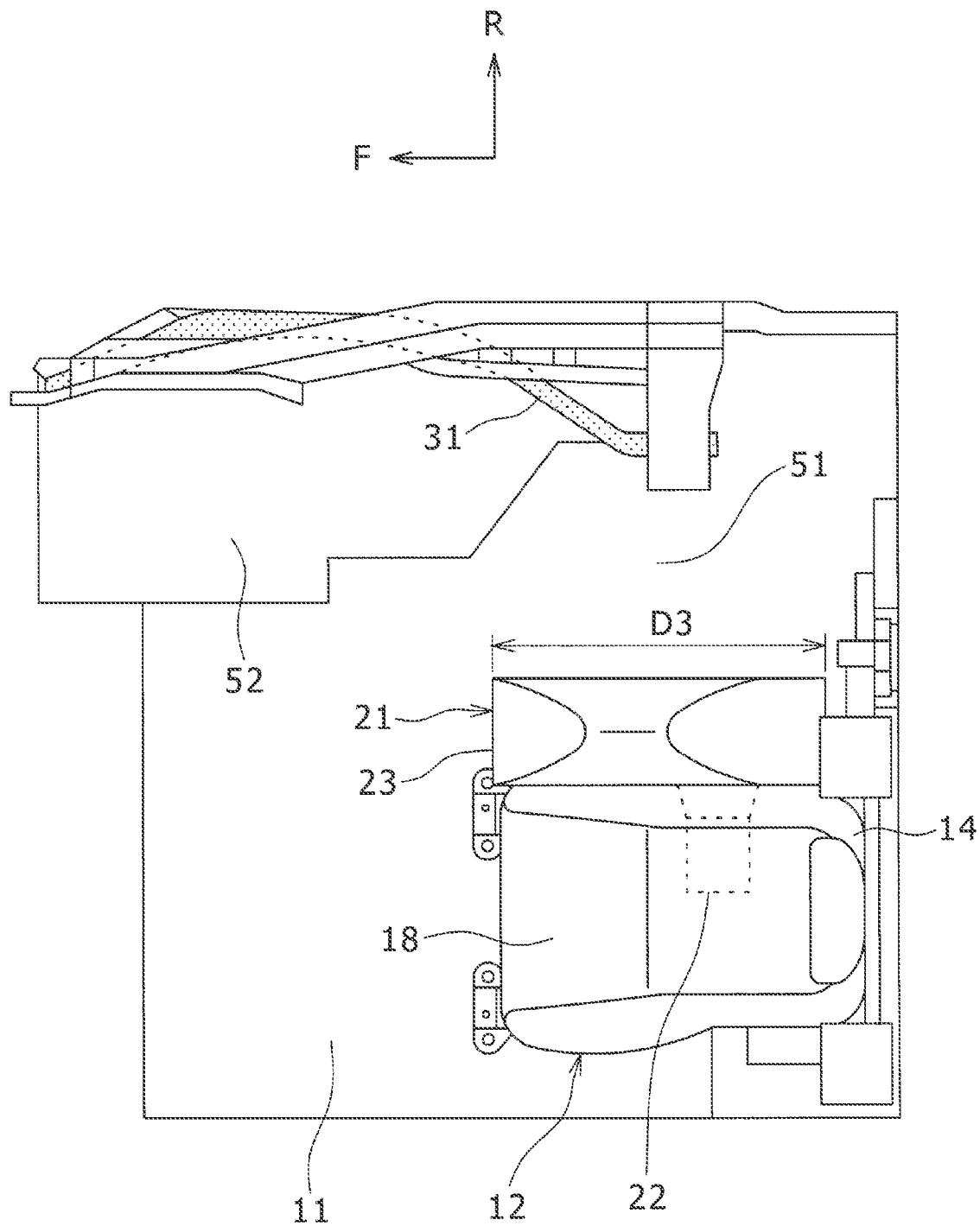
FIG. 4 is a view when
Figure 5:
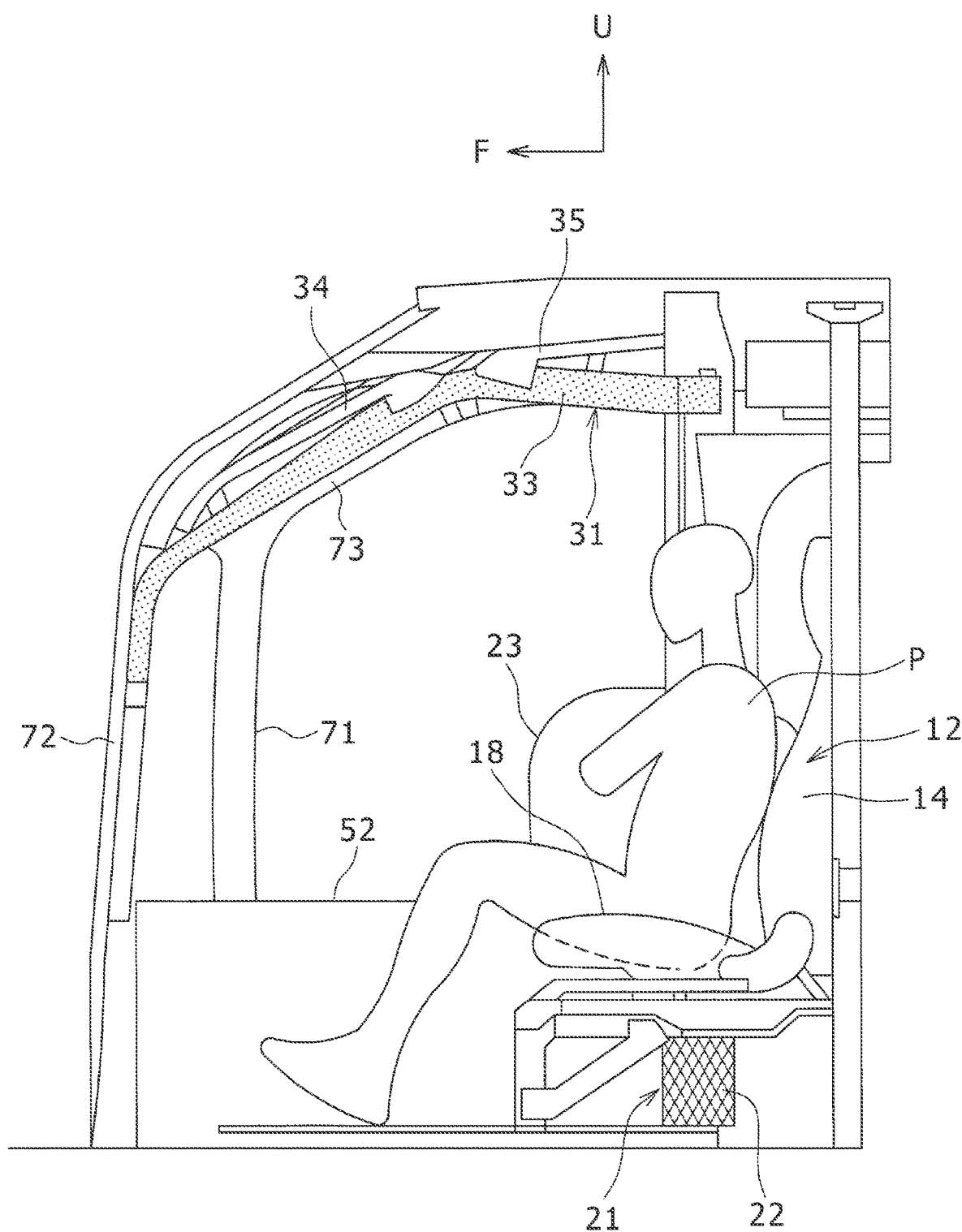
FIG. 5 is a view when

FIG. 3 illustrates a state where the seat-side airbag device 21 is activated. FIG. 4 is a view when FIG. 3 is viewed from above. FIG. 5 is a view when FIG. 3 is viewed from the left side of the vehicle 10. The seat-side gas cushion portion 23 is formed in a bag shape, for example, such that two fabric materials made of nylon-based resin or polyester-based resin are put on to face each other in the vehicle width direction in a deployed state, and outer peripheral edge portions of the fabric materials are sewn to each other. In a normal time when no collision occurs in the vehicle 10, the seat-side gas cushion portion 23 is housed in the case 22 in a folded state.

A sensor 54 configured to detect a side collision of the vehicle is electrically connected to the side collision ECU 53. The sensor 54 is an acceleration sensor, a pressure sensor, or the like. The side collision ECU 53 is configured to activate the first inflator at the time when the side collision ECU 53 detects a side collision based on an output from the sensor 54. When the first inflator is activated, the ignition agent is fired, so that gas generated in the gas generation portion is emitted from the gas emission port. Hereby, the gas is filled into the gas feed opening of the seat-side gas cushion portion 23 from the gas emission port, so that the seat-side gas cushion portion 23 is expanded and deployed. At this time, the seat-side gas cushion portion 23b reaks through the right side face part of the case 22. Note that, in actual practice, when a side collision is detected, the wall-side gas cushion portion 33 of the wall-side airbag device 31 is also deployed as well as the seat-side gas cushion portion 23 as will be described later. However, in FIGS. 3 to 5, in order to describe only a deployed state of the seat-side gas cushion portion 23, the wall-side gas cushion portion 33 is illustrated in a folded state.

As illustrated in FIGS. 3 to 5, after the seat-side gas cushion portion 23 breaks through the right side face part of the case 22 and comes out to the right side of the case 22, the seat-side gas cushion portion 23 is bent immediately upward, so that the seat-side gas cushion portion 23 can be deployed upward by passing by the right side face of the seat cushion 18. At this time, the seat-side gas cushion portion 23 is deployed in the front-rear direction and toward the aisle 51 side. In the deployed state of the seat-side gas cushion portion 23, a length D1 (FIG. 3) in the vehicle width direction is smaller than a length D2 (FIG. 3) in the up-down direction and a length D3 (FIG. 4) in the front-rear direction, for example. Hereby, the seat-side gas cushion portion 23 is easily deployed widely near the operator P, so that the seat-side gas cushion portion 23 easily protects the body of the operator P.

As will be illustrated in FIGS. 6, 7 to be described later, when the seat-side gas cushion portion 23 is deployed, the wall-side gas cushion portion 33 is deployed downward from the upper side of the vehicle cabin wall 50. When the upper body of the operator P falls down to the aisle 51 side due to a side collision, the seat-side gas cushion portion 23 also falls down to the aisle 51 side by being pushed by the operator P. A distal end part of the seat-side gas cushion portion 23 is pressed against the surface, on the aisle 51 side, of the wall-side gas cushion portion 33 deployed downward, so that the distal end part is restrained from greatly falling down to the aisle 51 side. This makes it possible to restrain the operator P from being greatly thrown out to the aisle 51 side.

The wall-side airbag device 31 is placed inside the vehicle cabin wall 50 above a window 71 (FIG. 5) on the side face and inside an end part of a ceiling surface 70 on the vehicle cabin wall 50 side. When a side collision of the vehicle 10 is detected, the wall-side gas cushion portion 33 (FIGS. 6, 7) of the wall-side airbag device 31 is deployed downward (an arrow-β direction in FIGS. 6, 7) from the upper side of the vehicle cabin wall 50.

More specifically, the wall-side airbag device 31 is placed such that the wall-side airbag device 31 extends rearward along a roof side portion 73 from the upper side of an A-pillar 72 of the vehicle, and a rear end part of the wall-side airbag device 31 bends and extends inwardly in the vehicle width direction, as illustrated in FIG. 5. The wall-side airbag device 31 includes the wall-side gas cushion portion 33 folded in a belt shape. The wall-side gas cushion portion 33 in a folded state is supported by a vehicle body such that the wall-side gas cushion portion 33 is placed inside a trim made of resin and forming the vehicle cabin wall 50 and inside a trim made of resin and forming the end portion of the ceiling surface 70 on the vehicle cabin wall 50 side. In FIGS. 1 to 5, the wall-side gas cushion portion 33 in a folded state is illustrated as a dotted area.

Further, the wall-side airbag device 31 includes two second inflators 34, 35 (FIG. 5). The side collision ECU 53 is electrically connected to each of the two second inflators 34, 35. Respective gas emission ports of the two second inflators 34, 35 are connected to two gas feed openings placed at positions distanced, in the longitudinal direction, from a part as a longitudinally intermediate part of the wall-side gas cushion portion 33 in a folded state.

When the side collision ECU 53 detects a side collision based on an output from the sensor 54, the side collision ECU 53 activates the second inflators 34, 35 at the same time as the first inflator. When the second inflators 34, 35 are activated, respective ignition agents are fired, so that gas is generated in respective gas generation portions and emitted from the gas emission ports. Hereby, the gas is filled into the gas feed openings of the wall-side gas cushion portion 33 from the gas emission ports of the second inflators 34, 35, so that the wall-side gas cushion portion 33 is expanded and deployed. At this time, the wall-side gas cushion portion 33 is deployed downward (the arrow-β direction in FIGS. 6, 7) by breaking through thinned parts of the trims of the vehicle cabin wall 50 and the ceiling surface 70.

Figure 6:
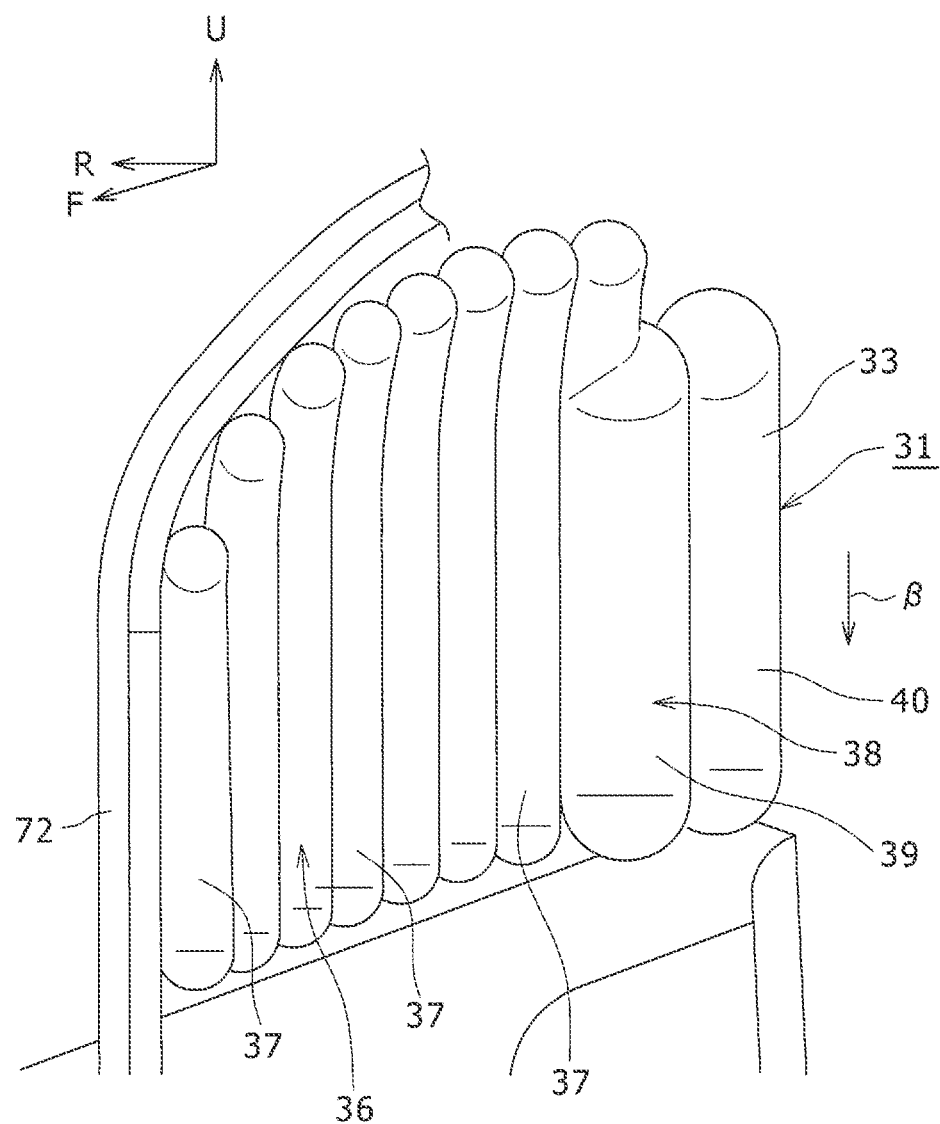
FIG. 6 is a perspective view of the vehicle viewed from a diagonally left upper side and illustrates a state where a wall-side airbag device is activated.
Figure 7:
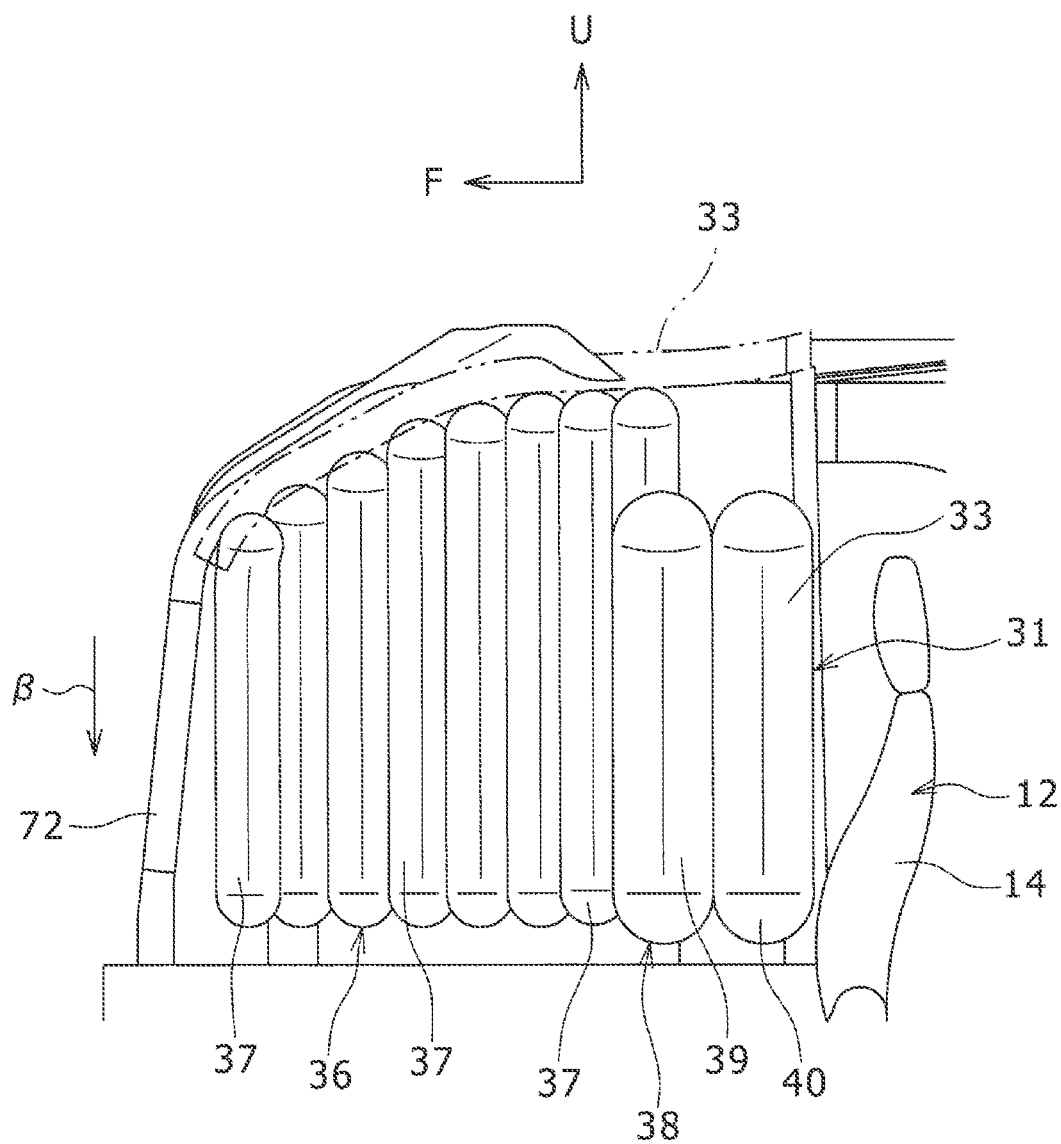
FIG. 7 is a view when

FIG. 6 is a perspective view of the vehicle viewed from a diagonally left upper side and illustrates a state where the wall-side airbag device 31 is activated. FIG. 7 is a view when FIG. 6 is viewed from the left side of the vehicle. The wall-side airbag device 31 is formed such that, in a deployed state, a plurality of tubular portions 37, 39, 40 elongated in the up-down direction is arranged in the front-rear direction in a connected manner. The tubular portions 37, 39, 40 are divided into a window facing portion 36 covering the window 71 (FIG. 5) and an overlap portion 38 connected to the rear end of the window facing portion 36 and constituted by two tubular portions 39, 40. The tubular portions 37 forming the window facing portion 36 are formed to have a cylindrical shape and configured such that the top and bottom ends thereof are covered with hemispherical portions, and chambers inside adjacent tubular portions communicate with each other. The tubular portions 37 of the window facing portion 36 are gradually decreased in height toward the front side along the shape of the window 71.

The front tubular portion 39 forming the overlap portion 38 is configured such that an upper end part of the front tubular portion 39 forms a small-diameter cylindrical portion that is generally the same shape as the tubular portion 37 provided in the rear end of the window facing portion 36, and an intermediate part and a lower end part of the front tubular portion 39 form a large-diameter cylindrical portion the diameter of which is larger than that of the upper end part thereof. The small-diameter cylindrical portion and the large-diameter cylindrical portion are connected to each other. The large-diameter cylindrical portion projects inwardly in the vehicle width direction from the small-diameter cylindrical portion. The rear tubular portion 40 of the overlap portion 38 has generally the same cylindrical shape as the intermediate part and the lower end part of the front tubular portion 39. The opposite ends of each of the tubular portions 39, 40 in the overlap portion 38 are also closed by hemispherical portions. The inner chamber of the window facing portion 36 communicates with the inner chamber of the overlap portion 38. When the seat-side gas cushion portion 23 of the seat-side airbag device 21 falls down to the aisle 51 side together with the operator P, the overlap portion 38 overlaps with the distal end part of the seat-side gas cushion portion 23 so as to restrain the seat-side gas cushion portion 23 from greatly falling down. Hereby, the overlap portion 38 can restrain the operator P from being greatly thrown out.

With the occupant crash protection device 20, in a case where a large space S is provided due to the presence of the aisle 51 between the seat 12 and the vehicle cabin wall 50, it is possible to restrain the operator P sitting on the seat 12 from being thrown out to the aisle 51 side when the vehicle has a side collision and to effectively absorb an impact to be applied to the operator P, without excessively upsizing respective single bodies of the airbag devices 21, 31.

Figure 8:
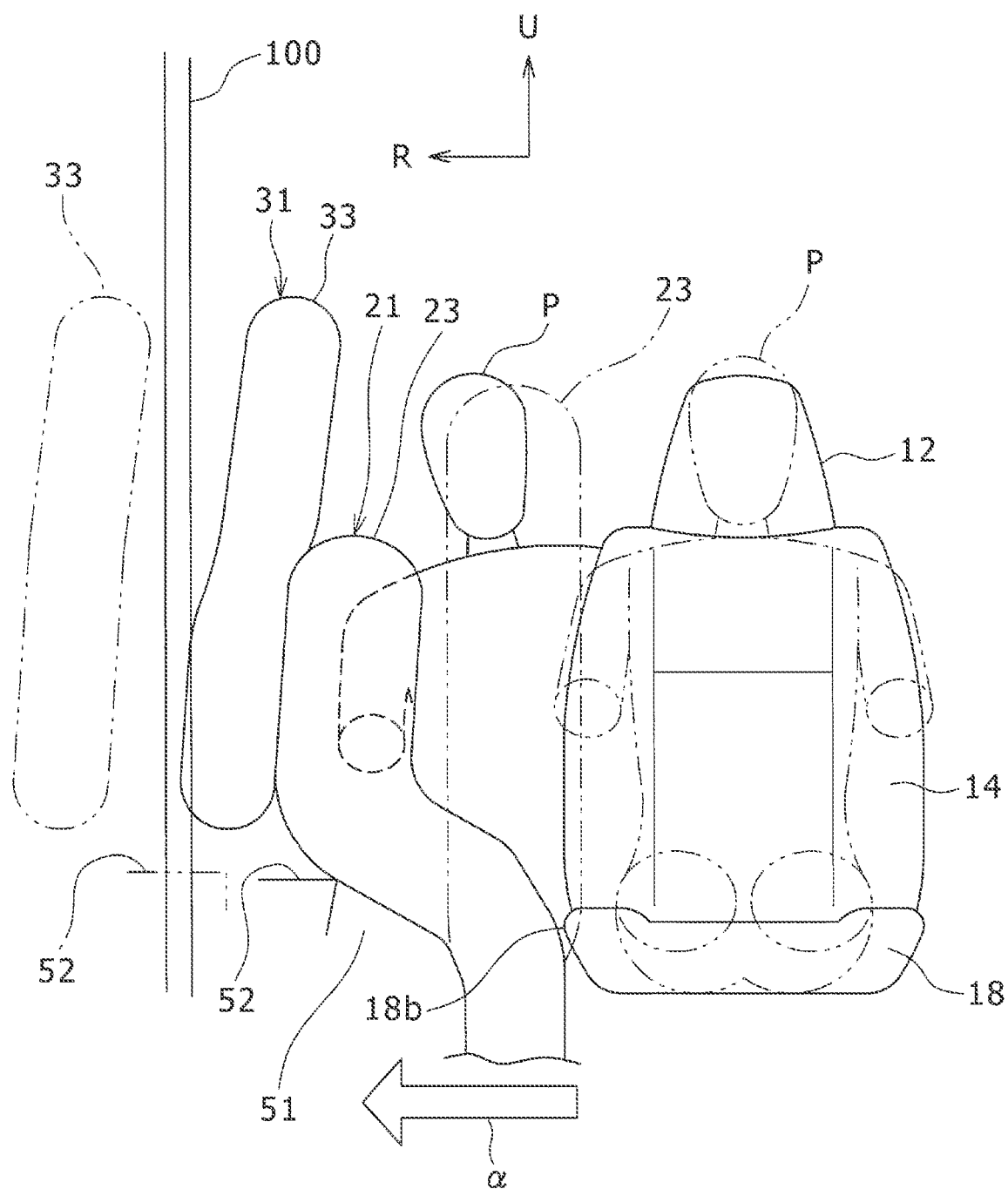
FIG. 8 is a schematic view corresponding to a part A in FIG. 1 and illustrates a state where the seat-side and wall-side airbag devices are activated when the vehicle has slid to an arrow-a direction in FIG. 8 and has collided with a test pole in a side collision test of the vehicle.

The following describes more details with reference to FIG. 8. FIG. 8 is a schematic view corresponding to a part A in FIG. 1 and illustrates a state where the seat-side and wall-side airbag devices 21, 31 are activated when the vehicle 10 has slid to an arrow-a direction in FIG. 8 and has collided with a test pole 100 in a side collision test of the vehicle 10. In the side collision test in FIG. 8, the vehicle 10 collides with the test pole 100 at a predetermined speed in the arrow-a direction in a state where the vehicle 10 is placed on a wagon (not shown). The test pole 100 is provided in a standing manner in the up-down direction. At this time, the seat-side and wall-side airbag devices 21, 31 are activated so that the gas cushion portions 23, 33 are deployed. When a load caused by the side collision is applied to the vehicle from an outer end on the aisle 51 side in the width direction, the operator P is thrown out to the aisle 51 side. In this case, the seat-side gas cushion portion 23 thus deployed is pushed by the operator P falling down to the aisle 51 side, so that the seat-side gas cushion portion 23 deforms to the aisle 51 side. At this time, the seat-side gas cushion portion 23 deforms such that its distal end side approaches the overlap portion of the wall-side gas cushion portion 33 deployed downward from the upper side. Hereby, an upper end side part of the seat-side gas cushion portion 23 as the distal end part of the seat-side gas cushion portion 23 is pressed against the wall-side gas cushion portion 33, so that the seat-side gas cushion portion 23 can easily support the body of the operator P moved to the aisle 51 side. This makes it possible to easily restrain the operator P from being greatly thrown out to the aisle 51 side and to easily absorb an impact to be applied to the operator P. Further, in this configuration, a support body that supports the operator P can be easily formed immediately by the two airbag devices 21, 31 without excessively upsizing respective single bodies of the airbag devices 21, 31. Accordingly, without excessively upsizing the respective single bodies of the airbag devices 21, 31, it is possible to restrain the operator P sitting on the seat 12 from being thrown out to the aisle 51 side when the vehicle has a side collision, and it is possible to effectively absorb an impact to be applied to the operator P.

In the meantime, as a comparative example, it is also conceivable that a gas cushion portion is deployed between a seat and a vehicle cabin wall only by a single body of an airbag device, that is, only by a vehicle-side airbag device or a seat-side airbag device so that the gas cushion portion extends in the vehicle width direction, and hereby, the gas cushion portion is stretched between an occupant sitting on the seat and the vehicle cabin wall. However, this case poses such a disadvantage that the single body of the airbag device is upsized and it takes time to deploy the gas cushion portion. Further, in a case where the gas cushion portion is upsized, the generation amount of gas increases, so that it is difficult to deploy the gas cushion portion accurately and stably.

Further, the seat-side airbag device 21 is placed under the seat cushion 18 of the seat 12, and the seat-side gas cushion portion 23 can be deployed upward by passing by a right side face 18b of the seat cushion 18. Hereby, as illustrated in FIG. 8, when the vehicle 10 has a side collision, the upper end side of the seat-side gas cushion portion 23 also moves to the aisle 51 side along with the movement of the operator P to the aisle 51 side. At this time, since the seat-side gas cushion portion 23 is deployed upward by passing by the right side face 18b of the seat cushion 18, most part of the seat-side gas cushion portion 23 in the up-down direction can be easily deformed along the body of the operator P. This makes it possible to more easily restrain the operator P from being greatly thrown out to the aisle 51 side. Further, since the seat-side airbag device 21 is placed under the seat cushion 18, a large width for the aisle 51 can be easily secured in a normal time.

Further, in FIG. 8, when the seat-side gas cushion portion 23 falls down, the right side face of the seat-side gas cushion portion 23 abuts with an upper end corner part of the inner end, in the vehicle width direction, of the cover portion 52 adjacent to the vehicle cabin wall 50, so that the seat-side gas cushion portion 23 can hardly slide downward. This also makes it possible to more easily restrain the operator P from being greatly thrown out to the aisle 51 side.

Note that, in the present embodiment, the deployment timing of the gas cushion portions 23, 33 of the seat-side airbag device 21 and the wall-side airbag device 31 is not limited to the time when a side collision of the vehicle is detected. When a control device determines that an abnormality with a possibility of a side collision occurs, the gas cushion portions 23, 33 may be deployed. For example, when the control device provided in the vehicle determines, based on an output from a sensor such as an acceleration sensor of the vehicle, that it is difficult to determine whether the vehicle has a front collision or a side collision, the gas cushion portions 23, 33 may be deployed.

Figure 9:
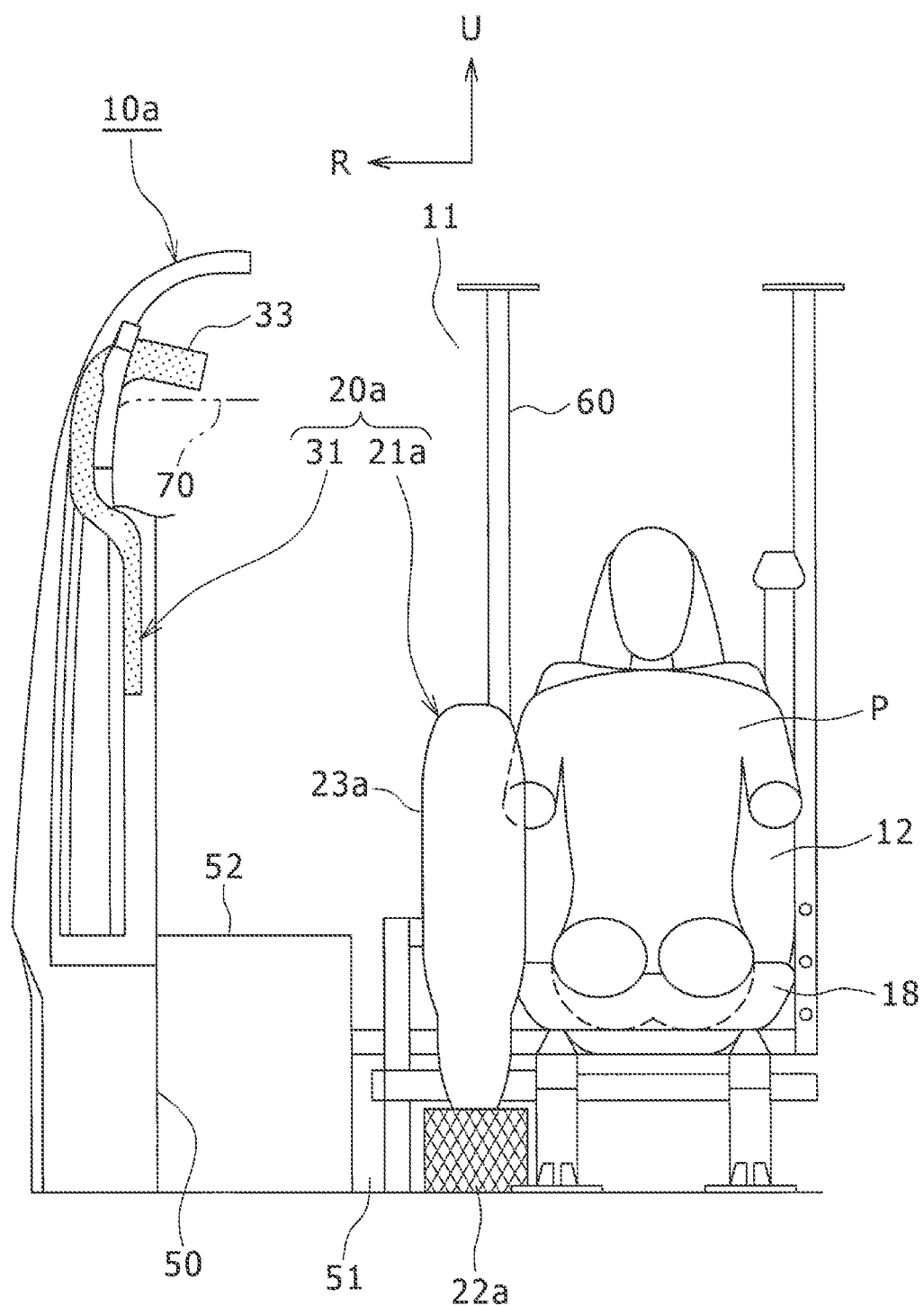
FIG. 9 is a cross-sectional view of a vehicle-cabin front part and illustrates a state where a seat-side airbag device is activated in a vehicle into which an occupant crash protection device according to another example of the embodiment of the present disclosure is incorporated.

FIG. 9 is a cross-sectional view of a vehicle-cabin front part in a state where a seat-side airbag device 21a is activated in a vehicle 10a into which an occupant crash protection device 20a according to another example of the embodiment is incorporated. In this example, a case 22a of the seat-side airbag device 21a is placed on the floor face so as to be closer to the aisle 51 side than the seat cushion 18 of the seat 12. A seat-side gas cushion portion 23a of the seat-side airbag device 21a can be deployed upward by passing by the right side face of the seat cushion 18. The case 22a has a thinned part on its upper side face part such that an opening through which the seat-side gas cushion portion 23a can pass to outside is to be formed in the thinned part.

Even with the configuration of this example, since the seat-side gas cushion portion 23a is deployed upward by passing by the right side face of the seat cushion 18 similarly to the configuration in FIGS. 1 to 8, most part of the seat-side gas cushion portion 23a in the up-down direction can be easily deformed along the body of the operator P. This can easily restrain the operator P from being greatly thrown out to the aisle 51 side. Other configurations and effects of the present example are similar to those in the configuration of FIGS. 1 to 8.

Figure 10:
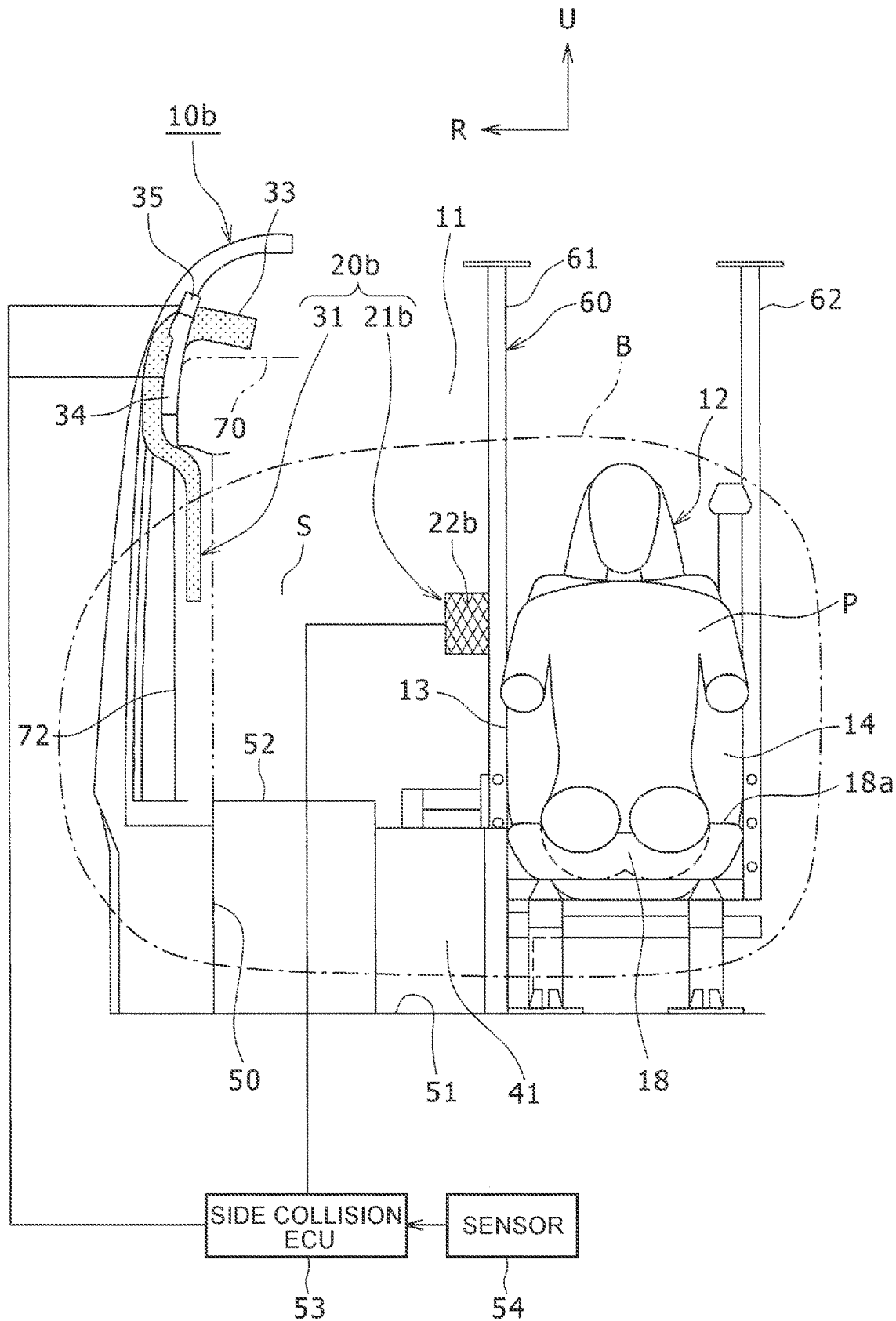
FIG. 10 is a cross-sectional view of a vehicle-cabin front part of a vehicle into which an occupant crash protection device according to another example of the embodiment of the present disclosure is incorporated.
Figure 11:
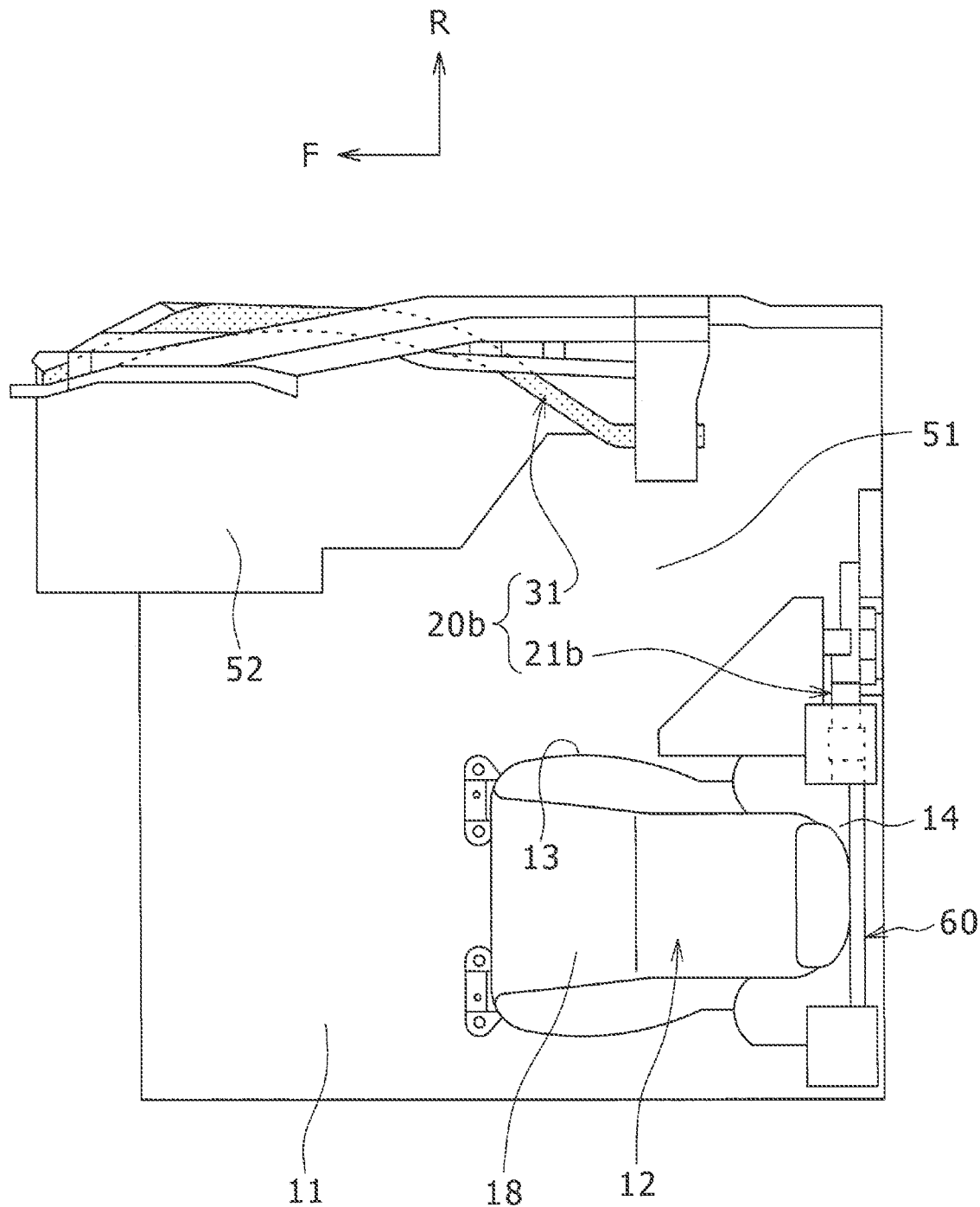
FIG. 11 is a view when

FIG. 10 is a cross-sectional view of a vehicle-cabin front part of a vehicle 10b into which an occupant crash protection device 20b according to another example of the embodiment is incorporated. FIG. 11 is a view when FIG. 10 is viewed from above. In the configuration of this example, a seat-side airbag device 21b is placed on the aisle 51 side of the seatback 14 of the seat 12, and a seat-side gas cushion portion 23b (FIG. 12) can be deployed forward.

More specifically, a case 22b of the seat-side airbag device 21b is fixed to the surface, on the aisle 51 side, of the pillar portion 61 forming the seat frame structure 60 behind the seat 12 and placed closer to the aisle 51 side than the seat 12 such that the case 22b is placed near an upper end part of the seatback 14. The upper end of the aisle-side pillar portion 61 is fixed to a ceiling portion.

The seat-side gas cushion portion 23b is housed inside the case 22b in a folded state. The seat-side gas cushion portion 23b can be deployed forward. For this purpose, a thinned part where an opening through which the seat-side gas cushion portion 23b can pass to outside is to be formed is formed in a front side face part of the case 22b. The first inflator fixed to the inside of the case 22b is connected to the seat-side gas cushion portion 23b similarly to the configurations of the above examples.

Further, on the floor face, a lower support base 41 is fixed at a position adjacent to the front side of the aisle-side pillar portion 61 on the right side of the seat 12. The lower support base 41 is provided to support the lower end of the seat-side gas cushion portion 23b when the seat-side gas cushion portion 23b is deployed forward. As illustrated in FIG. 11, the lower support base 41 is formed into a triangular pillar shape such that the shape of the lower support base 41 viewed from above is a generally right angled triangular shape. The lower support base 41 may be formed into a triangular tubular shape such that its upper end is closed by a cover portion. In the up-down direction, the upper end of the lower support base 41 is placed at the same position as or a position lower than the upper end of a part of the seating face 18a of the seat cushion 18, the part being adjacent to the lower support base 41. Further, the right side face of the lower support base 41 is an inclined surface inclined to the right side toward the rear side. This can restrain the width of a part of the aisle 51 on the right side of the lower support base 41 from being narrow.

Figure 12:
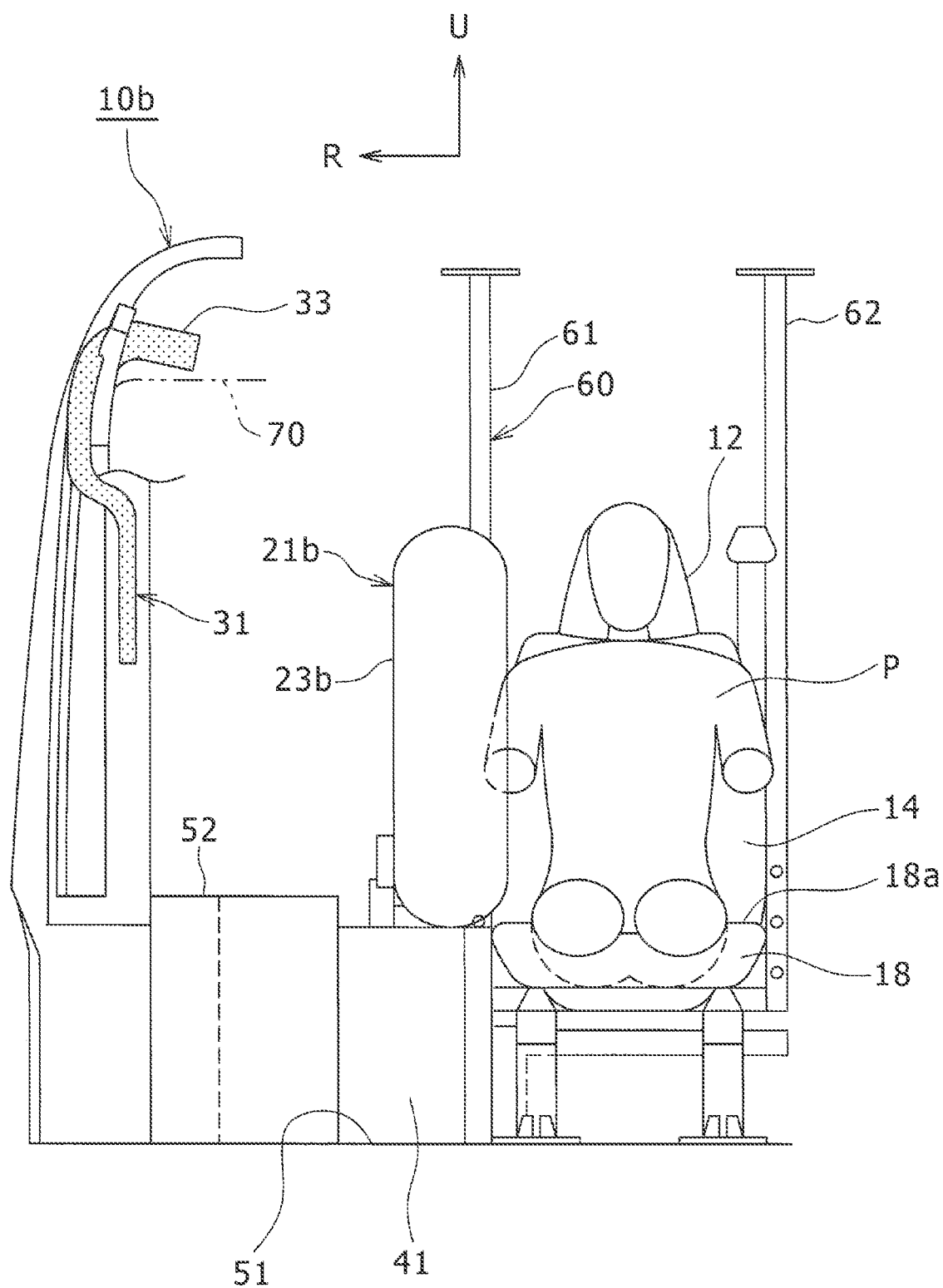
FIG. 12 is a view corresponding to FIG. 10 and illustrates a state where a seat-side airbag device is activated.
Figure 13:
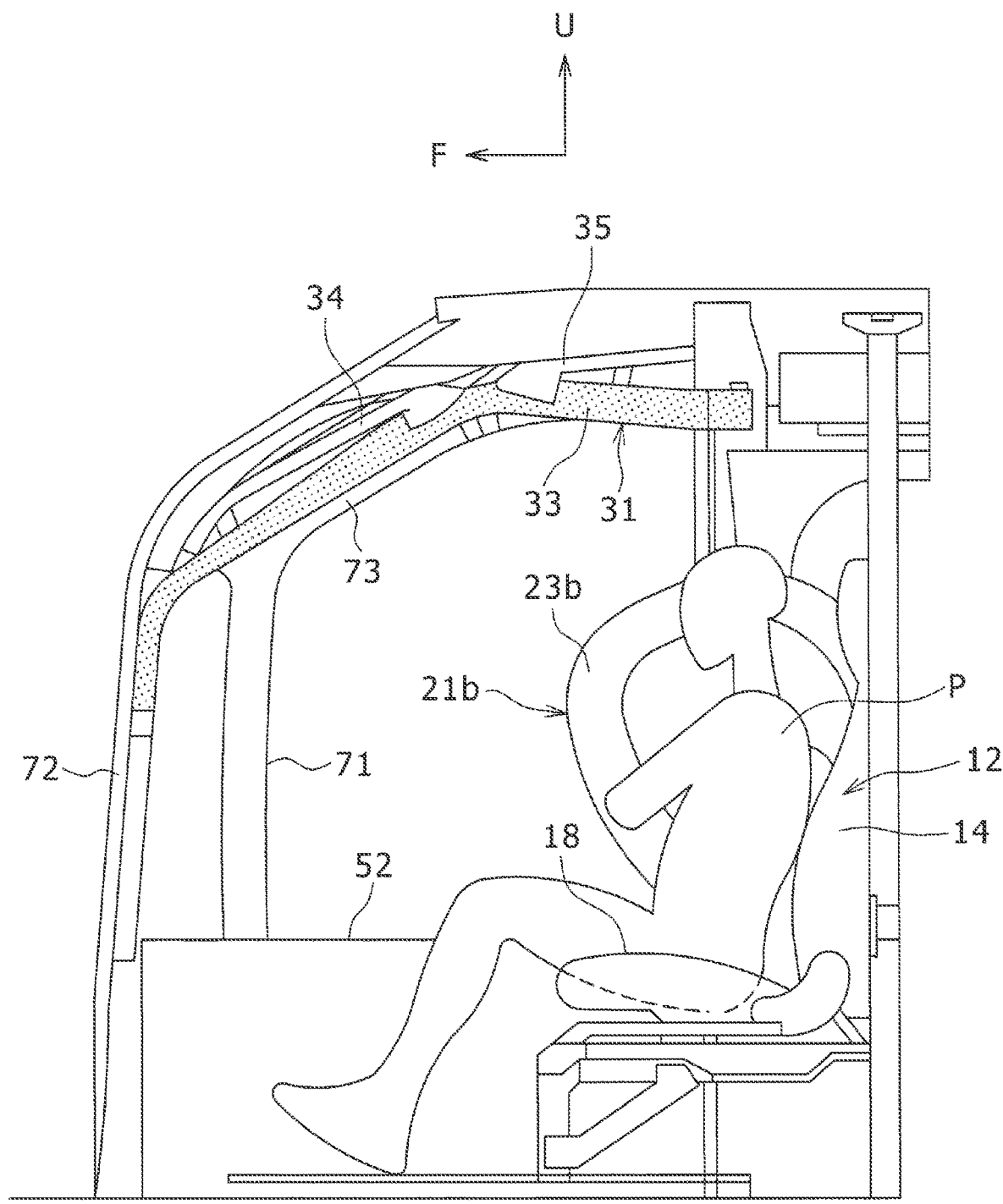
FIG. 13 is a view when

FIG. 12 is a view corresponding to FIG. 10 and illustrates a state where the seat-side airbag device 21b is activated. FIG. 13 is a view when FIG. 12 is viewed from the left side of the vehicle. When the seat-side airbag device 21b is activated, the seat-side gas cushion portion 23b is deployed forward by breaking through the front side face part of the case 22b and is also deployed downward and toward the aisle 51 side. In the deployed state of the seat-side gas cushion portion 23b, its length in the vehicle width direction is smaller than its length in the up-down direction and its length in the front-rear direction, for example. Hereby, the seat-side gas cushion portion 23b is easily deployed widely near the operator P, so that the seat-side gas cushion portion 23b easily protects the body of the operator P.

Even with the configuration of this example, in a case where the large space S is provided due to the presence of the aisle 51 between the seat 12 and the vehicle cabin wall 50, it is possible to restrain the operator P sitting on the seat 12 from being thrown out to the aisle 51 side when the vehicle has a side collision and to effectively absorb an impact to be applied to the operator P, without excessively upsizing respective single bodies of the airbag devices 21b, 31.

Figure 14:
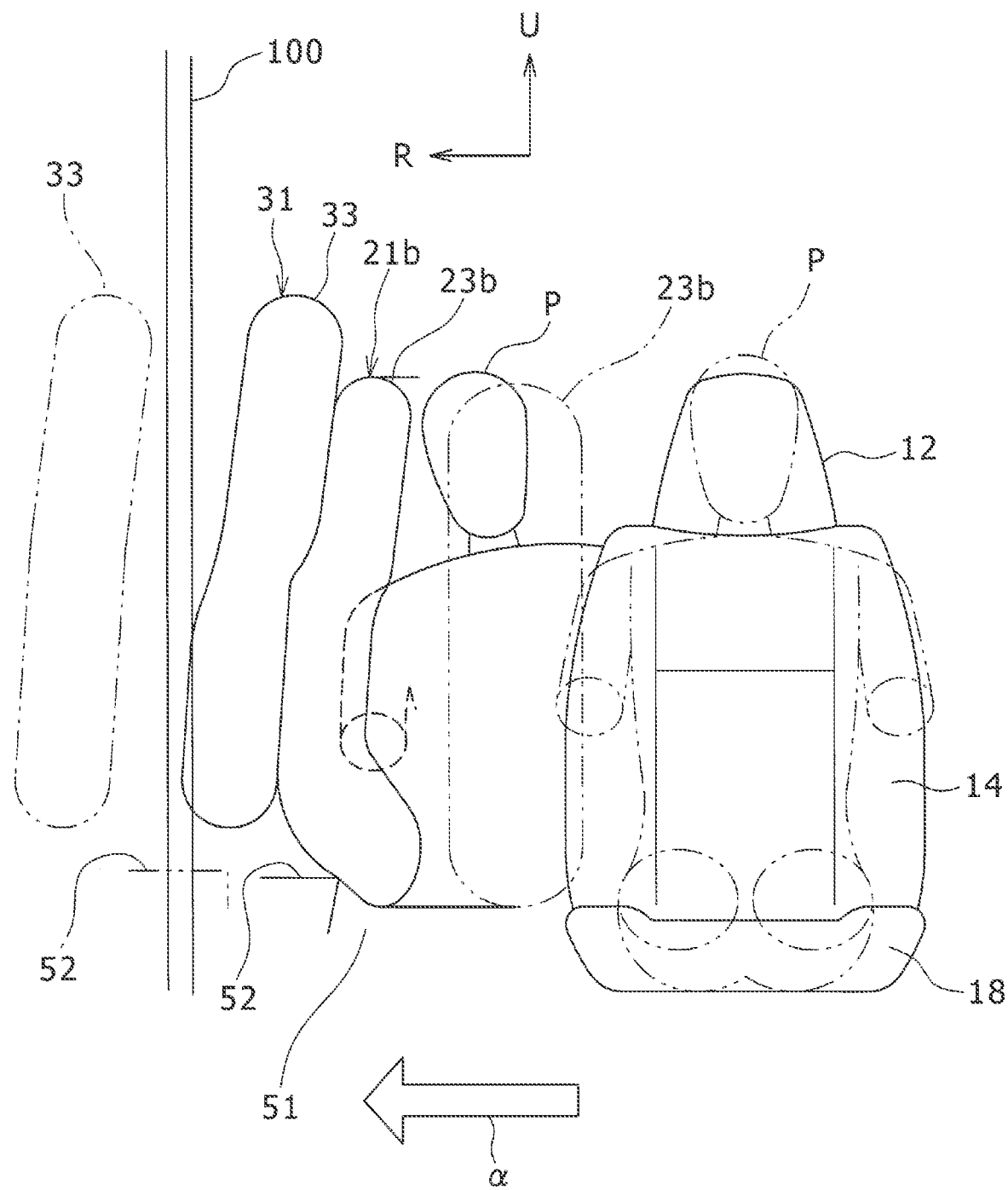
FIG. 14 is a schematic view corresponding to a part B in FIG. 10 and illustrates a state where the seat-side and wall-side airbag devices are activated when the vehicle has slid to an arrow-a direction in FIG. 14 and has collided with a test pole in a side collision test of the vehicle.
Figure 15:
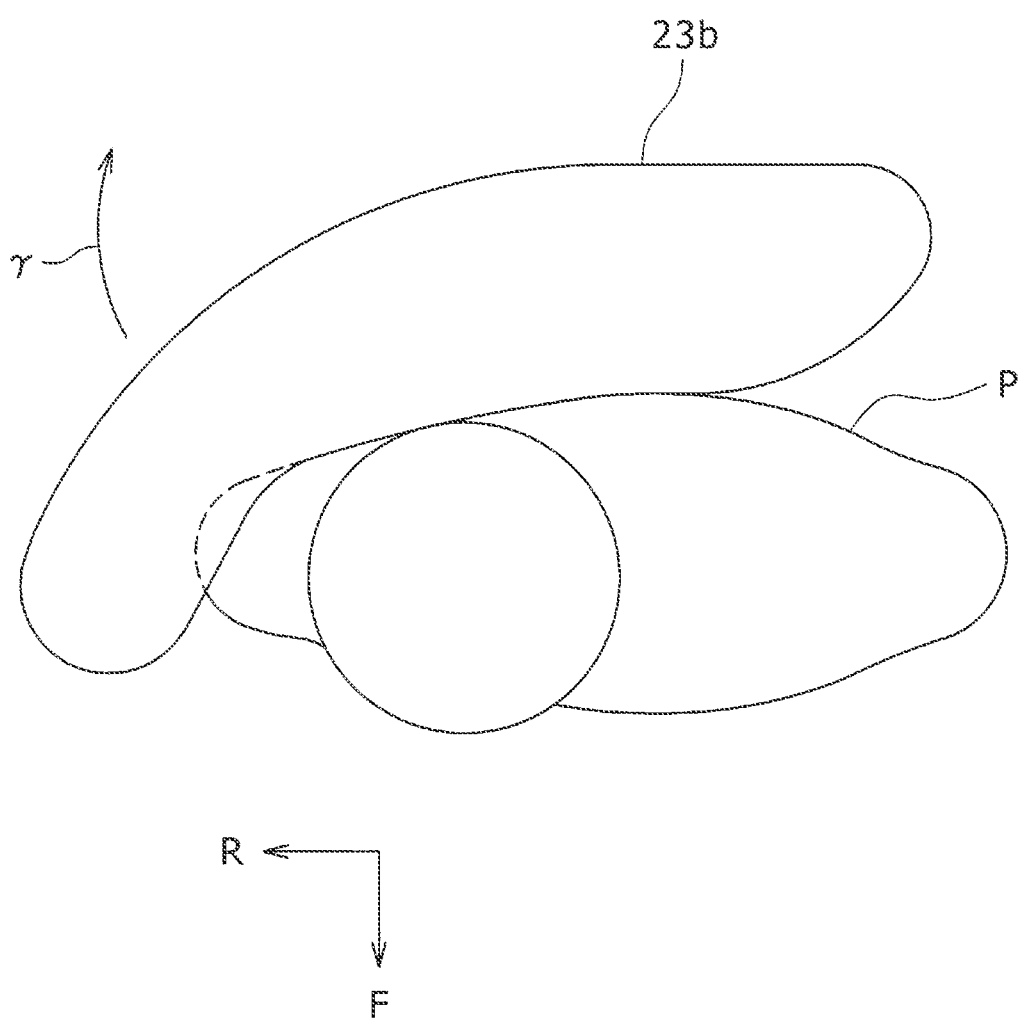
FIG. 15 is a view of a dummy falling down to an aisle side and a seat-side gas cushion portion of the seat-side airbag device viewed from above in FIG. 14.

The following describes more details with reference to FIGS. 14, 15. FIG. 14 is a schematic view corresponding to a part B in FIG. 10 and illustrates a state where the seat-side and wall-side airbag devices 21b, 31 are activated when the vehicle 10b has slid to an arrow-α direction in FIG. 14 and has collided with a test pole 100 in a side collision test of the vehicle 10b. In a state where the vehicle has collided with the test pole 100 in the arrow-a direction, the seat-side and wall-side airbag devices 21b, 31 are activated, so that the gas cushion portions 23b, 33 are deployed. Then, when the operator P is thrown out to the aisle 51 side, the seat-side gas cushion portion 23b deployed forward is pushed by the operator P falling down to the aisle 51 side, so that the seat-side gas cushion portion 23b deforms to the aisle 51 side. At this time, the seat-side gas cushion portion 23b is deployed outward such that its front end part is directed toward the vehicle cabin wall 50, as indicated by an arrow γ in FIG. 15. Then, the seat-side gas cushion portion 23b deforms such that its front end side as the distal end side of the seat-side gas cushion portion 23b approaches the overlap portion of the wall-side gas cushion portion 33 deployed downward from the upper side. Hereby, as illustrated in FIG. 14, the front end part of the seat-side gas cushion portion 23b as a distal end part of the seat-side gas cushion portion 23b is pressed against the wall-side gas cushion portion 33, so that the front end part can easily support the body of the operator P moved to the aisle 51 side. This makes it possible to easily restrain the operator P from being greatly thrown out to the aisle 51 side and to easily absorb an impact to be applied to the operator P. Other configurations and effects of the present example are similar to those in the configurations of the above examples.

Figure 16:
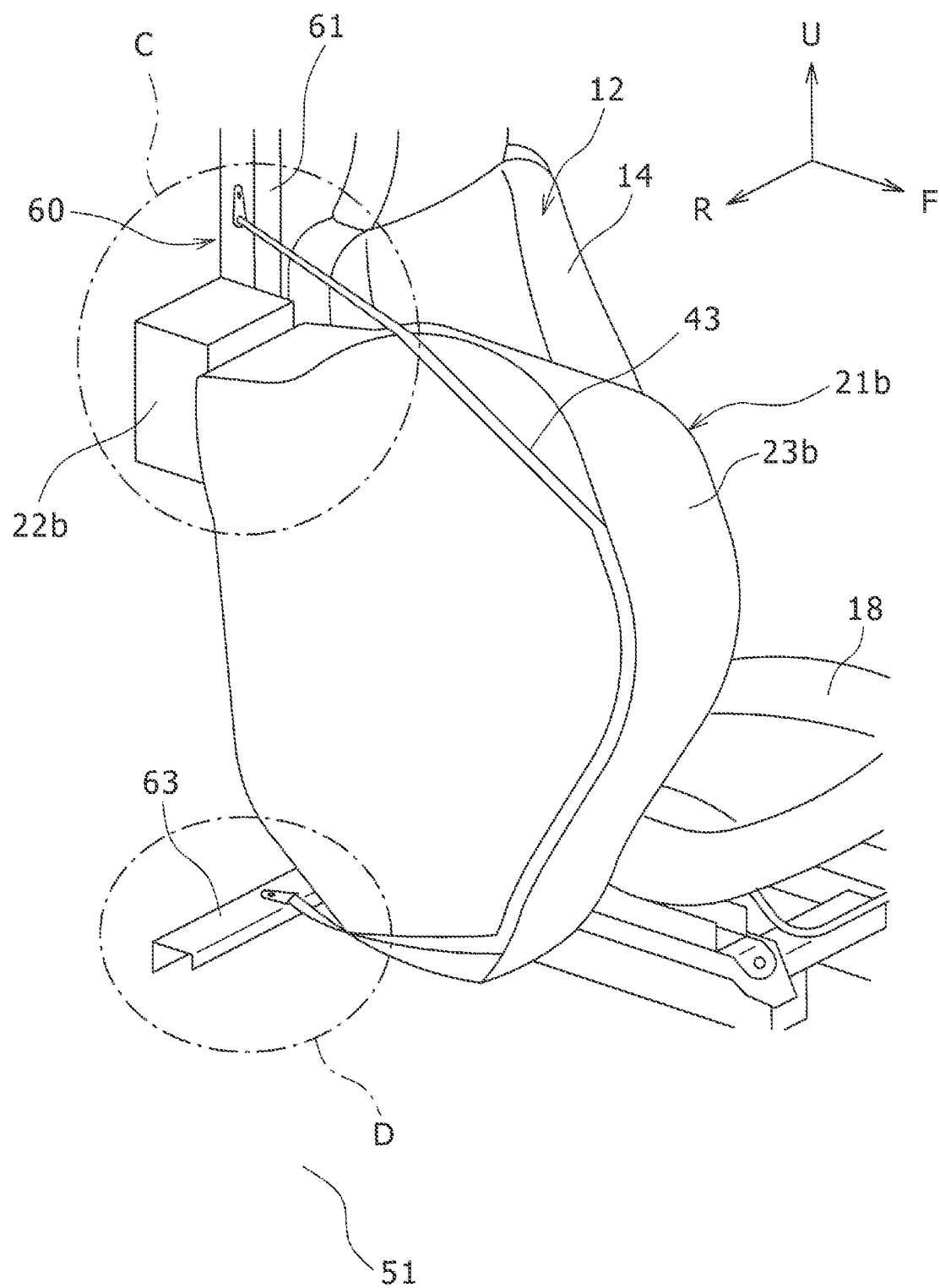
FIG. 16 is a perspective view around a seat and illustrates a state where a seat-side airbag device is activated in an occupant crash protection device according to another example of the embodiment of the present disclosure.
Figure 17:
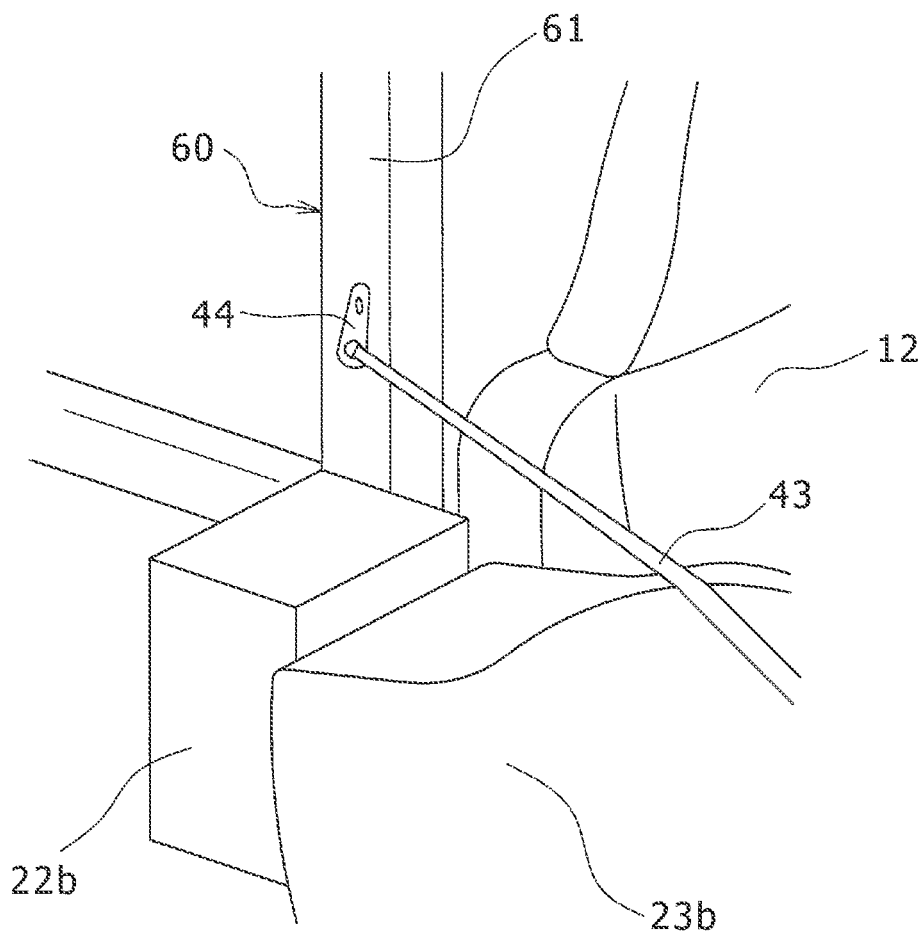
FIG. 17 is an enlarged view of a part C in FIG. 16.
Figure 18:
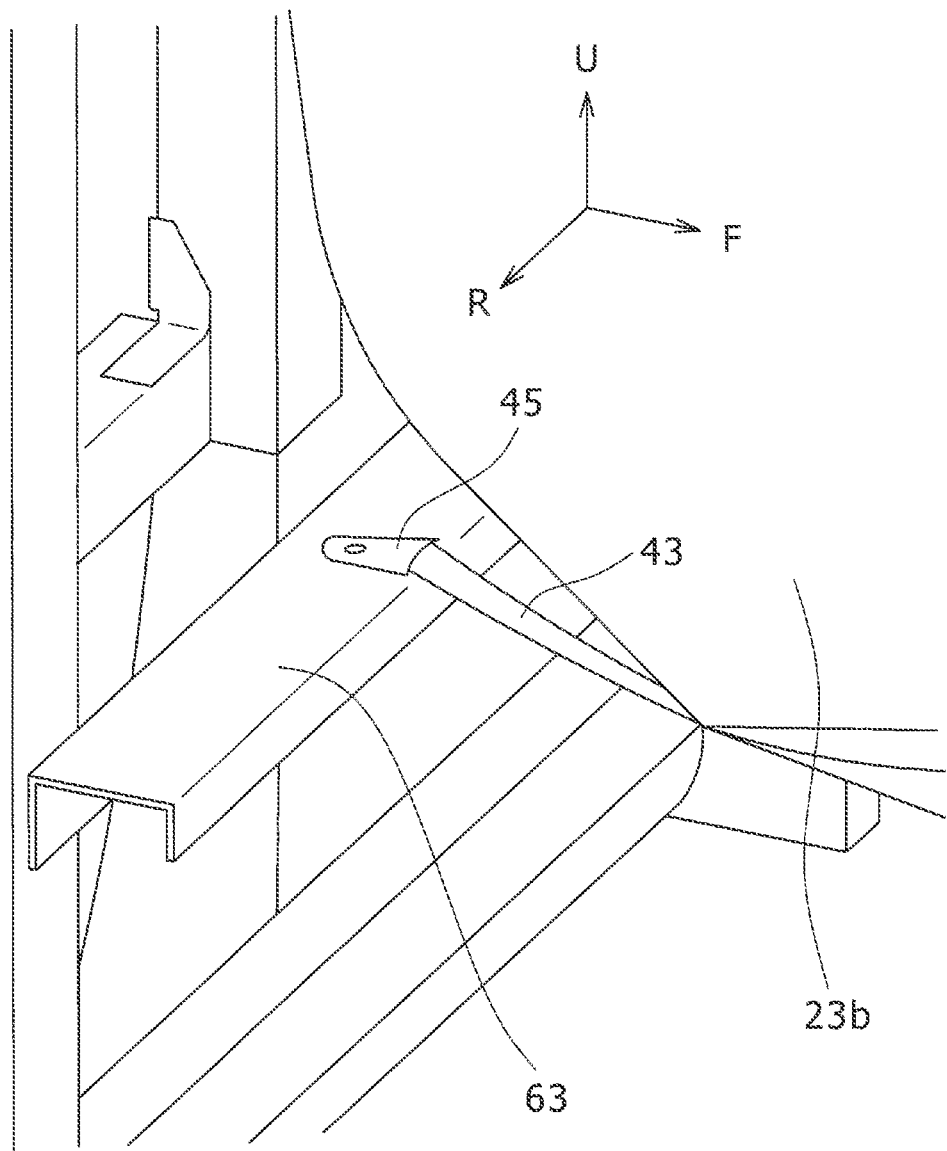
FIG. 18 is an enlarged view of a part D in FIG. 16.

FIG. 16 is a perspective view around the seat 12 and illustrates a state where the seat-side airbag device 21b is activated in an occupant crash protection device according to another example of the embodiment. FIG. 17 is an enlarged view of a part C in FIG. 16, and FIG. 18 is an enlarged view of a part D in FIG. 16. In the configuration of this example, in the deployed state of the seat-side gas cushion portion 23b, a longitudinally intermediate part of a reinforcing band 43 made of cloth or the like is attached and fixed to a front edge part of the surface, on the aisle 51 side, of the seat-side gas cushion portion 23b. The upper end of the reinforcing band 43 is attached via a first metal fitting 44 to a part of the surface, on the aisle 51 side, of the aisle-side pillar portion 61, the part being placed above the case 22b. The bottom end of the reinforcing band 43 is attached via a second metal fitting 45 to a lateral frame 63 constituting the seat frame structure 60 and extending in the vehicle width direction below the case 22b. In this example, a slit is formed near the thinned part of the front side face part of the case 22b, and the slit is closed by a rubber lip. The opposite ends of the reinforcing band 43 are led out through the slit and the rubber lip. Hereby, in a state where the seat-side gas cushion portion 23b is folded and housed inside the case 22b, the opposite ends of the reinforcing band 43 that are led out from the case 22b are attached to the pillar portion 61 and the lateral frame 63 via the first metal fitting 44 and the second metal fitting 45, respectively.

With the configuration of this example, in the deployed state of the seat-side gas cushion portion 23b, an upper part and a lower part of the reinforcing band 43 are pressed against the surface, on the aisle 51 side, of the seat-side gas cushion portion 23b, thereby restraining the seat-side gas cushion portion 23b from moving toward the aisle 51 side. Hereby, even in a case where a force to move the deployed seat-side gas cushion portion 23b toward the aisle 51 side is applied to the deployed seat-side gas cushion portion 23b from the operator P at the time of a side collision, the seat-side gas cushion portion 23b can hardly fall down toward the aisle 51 side, thereby making it possible to further restrain the operator P from being thrown out to the aisle 51 side at high speed. The reinforcing band 43 may be divided into the upper part and the lower part such that the upper part and the lower part are fixed to the front edge part of the seat-side gas cushion portion 23b in a separated manner. Other configurations and effects of the present example are similar to those in the configuration of FIGS. 10 to 15.

Note that the above description deals with a case where the wall-side gas cushion portion 33 is placed inside both the vehicle cabin wall 50 and the end part, on the vehicle cabin wall side, of the ceiling surface 70 in a normal time. However, the wall-side gas cushion portion 33 may be placed only inside the end part, on the vehicle cabin wall side, of the ceiling surface 70.

Further, the above description deals with a case where the aisle 51 is formed on the right side of the seat 12 in the vehicle cabin 11, the seat-side gas cushion portion 23, 23a, 23b of the seat-side airbag device 21, 21a, 21b can be deployed to the right side of the seat 12 that is the aisle 51 side of the seat 12, and the wall-side gas cushion portion 33 that can be deployed downward is placed on a side of the vehicle cabin wall 50, on the right side, that faces the aisle 51. In the meantime, such a configuration may be also employable that aisles are formed on both the right and left sides of the seat 12, or an aisle is formed only on the left side, so that the seat-side gas cushion portion can be deployed to the left side of the seat 12, and the wall-side airbag device including the wall-side gas cushion portion that can be deployed downward is placed on a side of the vehicle cabin wall on the left side.

Further, the above description deals with a case where the seat configured such that the seat-side airbag device 21, 21a, 21b is provided in the peripheral portion of the seat is the seat on which the operator P sits. However, the seat configured such that the seat-side airbag device is provided in the peripheral portion of the seat may be a passenger seat on which a passenger as the occupant sits. In this case, the seat-side gas cushion portion is deployed between the aisle and the passenger sitting on the passenger seat. Further, the wall-side airbag device including the wall-side gas cushion portion that can be deployed downward is provided on a side of a vehicle cabin wall facing the passenger seat.

Further, the vehicle is not limited to a bus-shaped vehicle and may be other types of vehicles including an aisle facing a side face of a seat in the vehicle width direction.

What is claimed is:

1. An occupant crash protection device for a vehicle including a seat on which an occupant sits and an aisle between a side face of the seat in a vehicle width direction and a vehicle cabin wall facing the side face, the occupant crash protection device comprising:
   a seat-side airbag device configured to deploy a seat-side gas cushion portion between the aisle and the occupant sitting on the seat, the seat-side airbag device being placed around the seat; and
   a wall-side airbag device including a wall-side gas cushion portion configured to be deployed downward from an upper side of the vehicle cabin wall, the wall-side airbag device being placed inside an end part, on the vehicle cabin wall side, of a ceiling surface, the seat-side gas cushion portion and the wall-side gas portion overlap in the vehicle width direction when in a deployed state.

2. The occupant crash protection device according to claim 1, wherein:
   the seat-side airbag device is placed under a seat cushion having a seating face of the seat or closer to the aisle side than the seat cushion; and
   the seat-side gas cushion portion is configured to be deployed upward by passing by a side face of the seat cushion in the vehicle width direction.

3. The occupant crash protection device according to claim 1, wherein:
   the seat-side airbag device is placed on the aisle side of a seatback of the seat; and the seat-side gas cushion portion is configured to be deployed forward.

* * * * *